July 4, 1939.    D. J. PURDIE    2,165,153
PROPORTIONAL FLOW MECHANISM
Filed Feb. 26, 1936    3 Sheets—Sheet 1
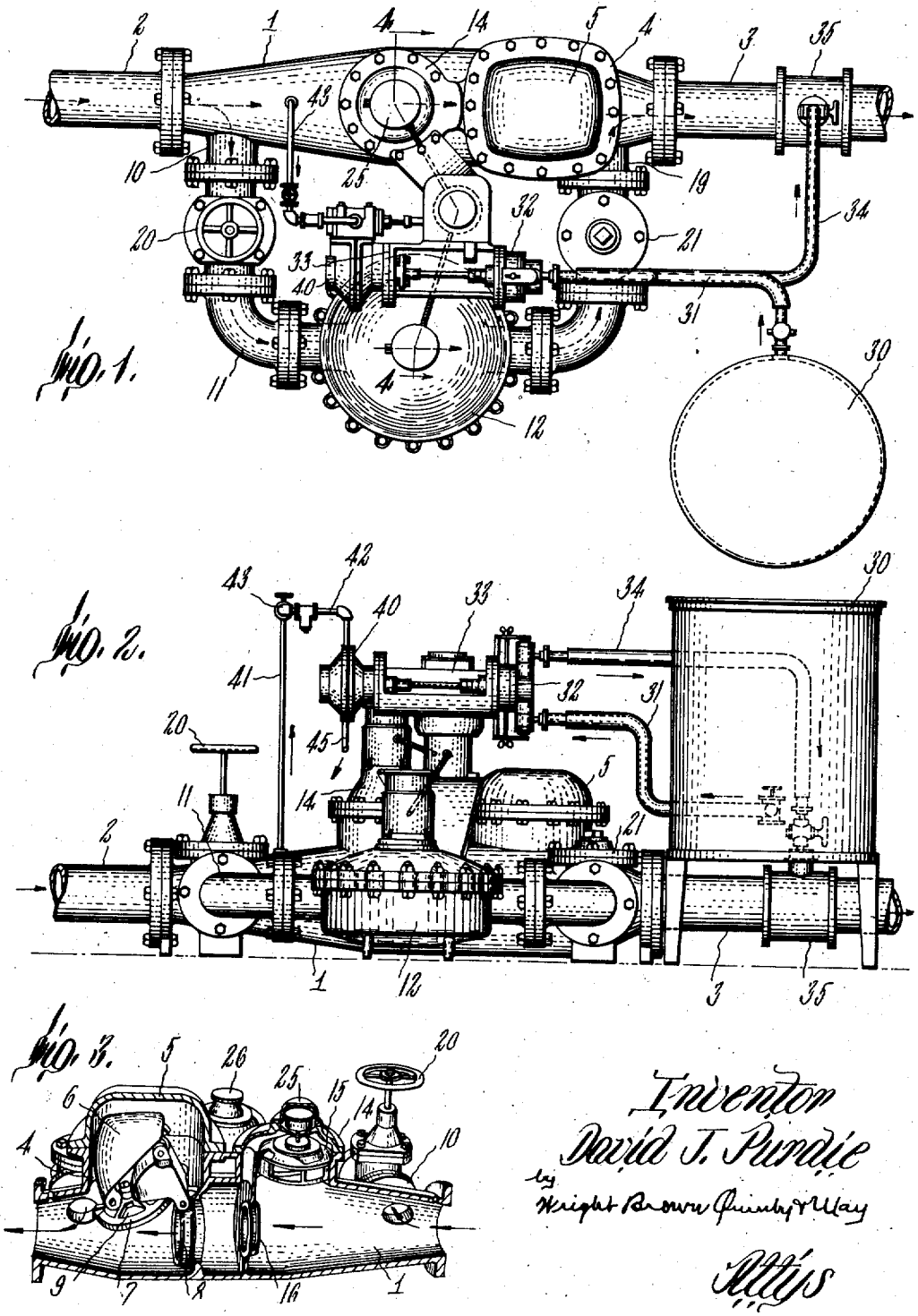

July 4, 1939.   D. J. PURDIE   2,165,153
PROPORTIONAL FLOW MECHANISM
Filed Feb. 26, 1936   3 Sheets-Sheet 2
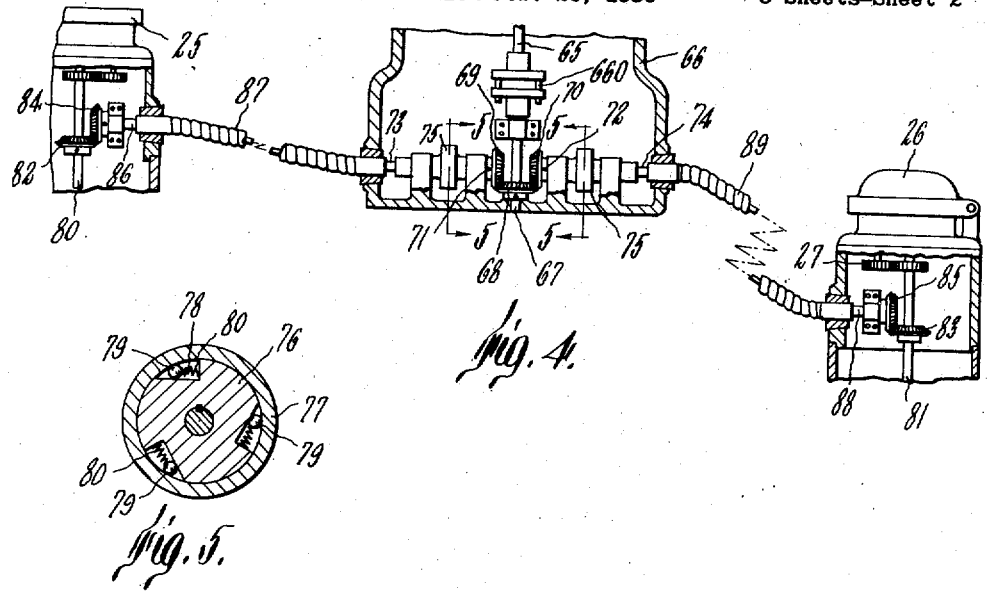
Fig. 4.
Fig. 5.
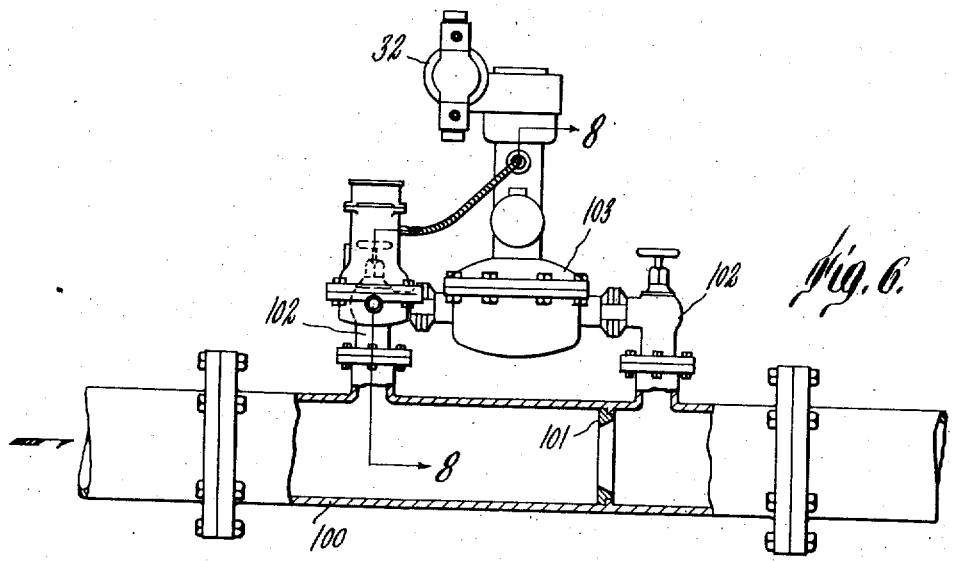
Fig. 6.
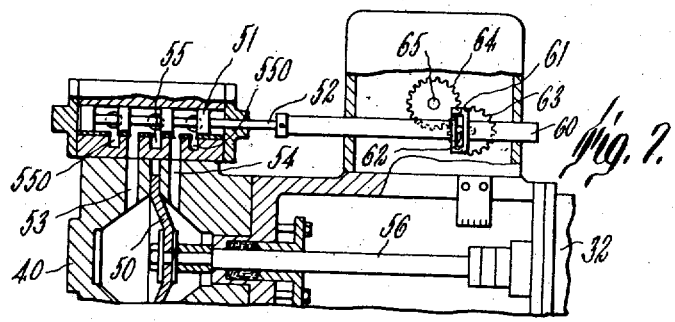
Fig. 7.
Inventor
David J. Purdie
by Wright Brown Quinby & Way
Attys.

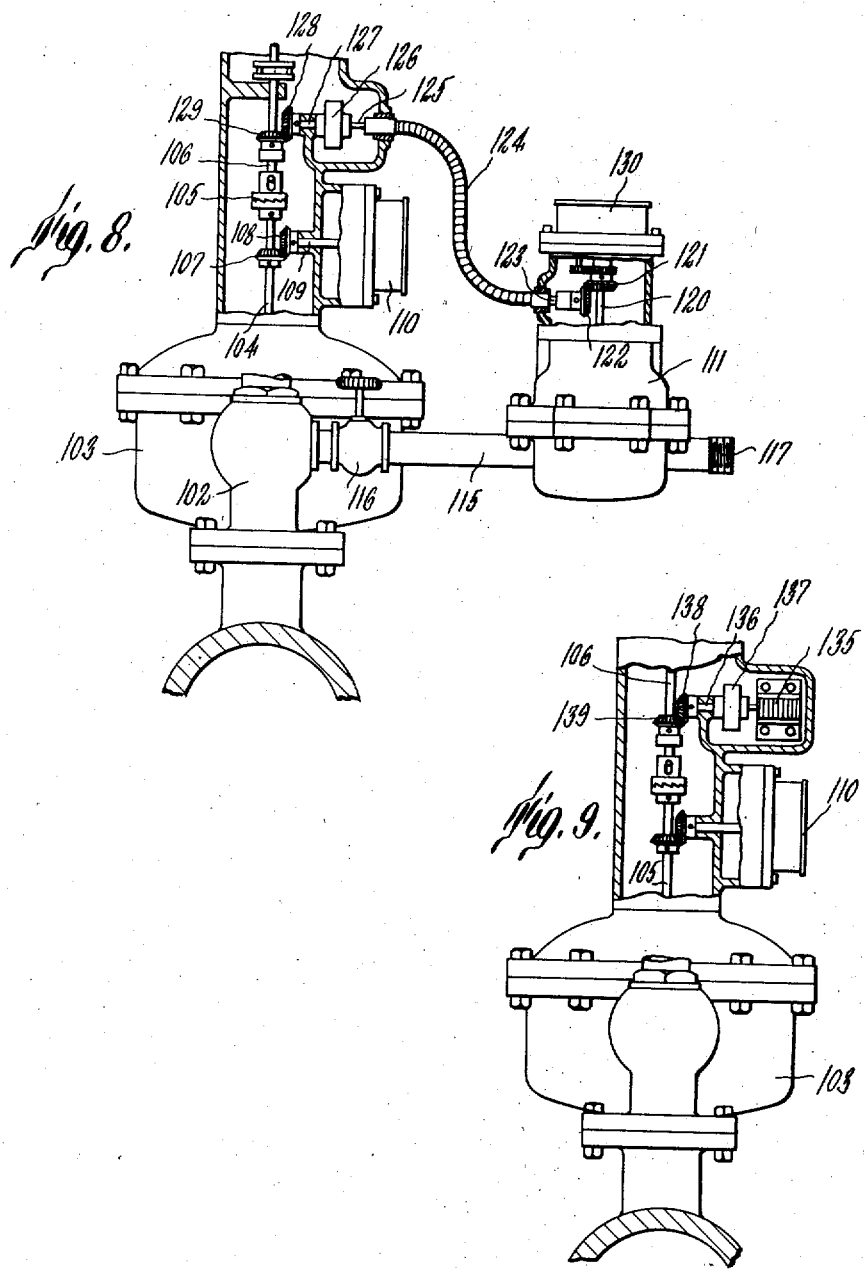

Patented July 4, 1939

2,165,153

UNITED STATES PATENT OFFICE 2,165,153

PROPORTIONAL FLOW MECHANISM

David J. Purdie, Verona, N. J., assignor of one-half to Hersey Manufacturing Company, Boston, Mass., a corporation of Massachusetts, and one-half to Proportioneers, Inc., Providence, R. I., a corporation of Rhode Island Application February 26, 1936, Serial No. 65,798

4 Claims. (Cl. 210—17)

The invention relates to mechanism by which a flow of a fluid is caused to produce a flow of another fluid or fluent material in at least a somewhat proportional manner, and has for an object to provide for a regulated flow of the other fluid or fluent material in situations where the mechanism by which such regulated flow is normally produced or regulated in response to the flow of the first fluid, is at times either inoperative or not wholly effective as by reason of conditions of the first flow to which it may not satisfactorily respond. For example, a meter may be employed as such mechanism, but a meter particularly designed for volumetric measuring during large flows will ordinarily not function satisfactorily to measure during small flows and a meter capable of measuring during small flows with sufficient accuracy may be of much too small capacity to measure during large flows.

According to this invention, therefore the means for producing the second-mentioned flow is actuated or controlled by any one or more of a plurality of means, each of which is best adapted to respond to some flow or range of flows of the primary fluid. Ordinarily but two such means will be found necessary, but more might be used if found desirable in any particular case.

An important commercial example of a situation where this invention is of particular utility is found in mechanism for applying chemical treatment to water, the chemical being the material of the secondary or controlled flow, and being introduced into the main or controlling flow. A usual chemical treatment for water is chlorination, this being employed to render potable water which otherwise might not be safe to drink. The chlorinating liquid is introduced in small amounts into the water supply, the rate of such introduction being determined by a flow responsive motor, as, for example, a meter by which the volume of water is measured. Often a meter which is suitable for measuring during the normal day time flow of water when the demand is relatively large will not be operated by the relatively small night flow, and should the introduction of chlorine be determined entirely by the flow of water through such a meter, there would result a dangerous condition wherein in the morning before or at the resumption of the larger daylight flow the pipes would be filled with entirely untreated water due to the failure of the meter to be operated during the night while the flow was small.

Another condition would arise when at times the demand for water is greatly increased over usual conditions, as, for example, where the supply is drawn upon to fight fire. In such a situation a meter satisfactory for measuring the normal supply would be too small to register the large demand. This large demand volume would need to be measured, at least partly, by a large meter which might be entirely out of service during long periods of time. For such service it is usual practice to provide what is known as a "compound type" meter containing a pair of metering units, one for measuring during normal relatively small rates of flow, and the other or both together registering during the large rates of flow. If a separate chlorinator be employed for each metering unit, not only would this require one chlorinator which might be idle for very long periods, thus adding to the cost of the installation the cost of this additional equipment, but the chlorinating liquid, being of a corrosive nature, would be likely to so attack or clog the mechanism of the normally idle chlorinator that whenever it might be called upon to function, it would not be in condition to do so.

In accordance with the present invention but a single chlorinator would be required actuated by one or the other or by both of the meter units, thus avoiding the expense of one or more additional such mechanisms, and this single chlorinator would be in operation substantially continuously so that it would not have an opportunity to deteriorate or become clogged because of long idle periods.

For a more complete understanding of this invention, reference may be had to the accompanying drawings in which Figures 1 and 2 are a top plan and a side elevation, respectively, of a mechanism embodying this invention.

Figure 3 is a perspective view partly broken away and in section of a portion of the mechanism shown in Figures 1 and 2.

Figure 4 is a detail section on line 4—4 of Figure 1.

Figure 5 is a detail section on line 5—5 of Figure 4.

Figure 6 is a side elevation partly broken away showing a modification.

Figure 7 is a detail partly in section showing the control of a pump mechanism which may be employed and which is shown in Figures 1 and 2.

Figure 8 is an elevation partly broken away and in section on line 8—8 of Figure 6.

Figure 9 is a view similar to Figure 8, but showing a modification.

Referring first to Figures 1, 2 and 3, there is represented a meter of the compound type and known commercially as a "fire service meter" to which the subject matter of this invention has been applied. Referring to these figures, at 1 is indicated a conduit for liquid which may be interposed in a pipe line, being attached at one end to the in-flow pipe 2 and at the other end to the out-flow pipe 3. The conduit 1 is shown as provided with an enlarged portion 4 provided with a suitable cover 5 and within which is positioned a valve mechanism 6. This mechanism 6 is provided with a seat element 7 which at the time of relatively small flow engages a mating annular seat 8 arranged in the line of flow, so that the flow takes place through the by-pass including the pipes 10 and 11 and the meter 12. At times of large flow, however, the valve mechanism 6 will be lifted by increase of pressure of the liquid thereagainst and decrease of pressure back of it, whereupon the fluid may pass freely through the annular seat member 8. The conduit 1 also is provided with a meter 14 having a casing formed as an extension from the conduit 1, as shown this being a disk meter with its measuring unit 15 arranged in a by-pass around the constricting ring or orifice 16 in the conduit. The flow through the by-pass comprising the pipes 10, 11 and meter 12 is controlled as by the control valve 20 and the check valve 21, which permit the repair or removal of the meter 12 without shutting off flow through the main line. The meter 12 may be of any suitable type such as the well known disk meter. The mechanism just described is a well known type of "fire service meter", small volumes being measured entirely by the meter 12, and large volumes being measured primarily by the proportional meter 14, but to some extent also by the small meter 12.

Each of the individual meters is provided with its own registering mechanism, the meter 14 having its registering mechanism within the cap 25 and the meter 12 having its registering mechanism within the cap 26. The reading of the registering mechanism within the cap 26 will show the amount passed during normal relatively low flows through the conduit 1, but it is necessary to read the registering mechanism beneath the cap 25 as well in order to read the amount passed during periods of large flow when both metering units are in operation.

At 30 (Figures 1 and 2) is indicated a tank for containing the chemicals for the controlled flow which, in the mechanism shown, are to be supplied to the water measured by the fire service meter. From this tank an intake pipe 31 leads to the intake of the pumping end 32 of a doser pump indicated generally at 33. The discharge from this pump end passes through the pipe 34 and is connected into the main line 3 as through the T fitting 35. This doser pump may be operated by any suitable power means and at a rate determined by the actuation of either or both of the metering units of the fire service meter. As shown it is actuated by a fluid pressure motor of the diaphragm type 40, which may take its supply of fluid under pressure through the lines 41 and 42 and the controlling valve 43 from the conduit 1 in advance of the metering unit 14. A discharge pipe for this motor 40 is shown at 45.

Certain details of this motor 40 are shown in Figure 7. The alternate supply and discharge of fluid through the ports 53 and 54 from inlet 55 and to outlets 55a on opposite sides of the diaphragm 50 is controlled by means of a suitable valve 51 having a valve stem 52 by which it may be operated. The diaphragm 50 is connected to the piston rod 56 which also forms the piston of the pump portion 32. The discharge from the motor 40 may be passed to waste or any other suitable disposition may be made of it. The valve 51 is moved back and forth to determine the speed of operation of the pump 32 by suitable means actuated from one or both of the meter units. As shown in Figure 7, the rod 52 may be attached to a bar 60 provided intermediate its ends with a laterally slotted crosshead 61 within which rides a crank pin 62 secured to a gear wheel 63. This gear wheel 63 meshes in turn with a driving gear 64 carried by an actuating shaft 65. As shown best in Figure 4, this actuating shaft 65 is mounted for rotation within a casing 66 attached to the frame of the pump mechanism 32 and it may be coupled at its lower end 66a with a shaft 67 carrying a bevel gear 68. Meshing with this bevel gear 68 are two bevel gears 69 and 70, respectively. These gears 69 and 70 are fixed to rotary shafts 71 and 72, respectively, with which are alined shafts 73 and 74, the shafts 71 and 73 and 72 and 74 being connected together, respectively, by any suitable form of overrunning clutch 75. A suitable form of clutch shown in section in Figure 5, comprises a central disk 76 and a sleeve portion 77 journaled on the periphery of the disk 76. This disk 76 is shown as provided with one or more recesses 78 in its periphery within which may ride ball clutch elements 79 backed up by springs 80, these springs acting to press the balls outwardly against the inner face of the sleeve 77 so as to wedge against the inner face of this sleeve when the sleeve and disk are driven relatively in one direction to lock them together but to permit free relative rotation of these parts in the other direction. Thus, if either one of the shafts 73 or 74 is driven faster than the other, the faster driven shaft will drive its bevel gear 69 or 70, the gear 68 and shaft 65, while the other gear 69 or 70 is driven idly from the gear 68. The valve mechanism of the pump 32 is then actuated from the faster rotating of the shafts 73 or 74 while the shaft 73 or 74, running at the lower rate, is ineffective either to drive or to prevent the driving of this valve mechanism.

The meter 14 has its register driving shaft shown at 80 in Figure 4 and the meter 12 has a register driving shaft 81. These driving shafts have secured thereto bevel gears 82 and 83, respectively, with which mesh the bevel gears 84 and 85, respectively. The bevel gear 84 is fixed on the inner end of a shaft 86 which is connected as through a flexible shaft 87 with shaft 73, while the gear 85 fixed on the inner end of a shaft 88 is connected as by a similar flexible shaft 89 with the shaft 74. Thus whichever of the flexible shafts is rotated the faster at any time, that shaft only is effective to drive the shaft 65 and to control the rate of actuation of the motor 40 and thus the rate of flow of the treating liquid from the tank 30 into the pipe line 3.

During relatively low flows in the conduit 1 the valve mechanism 6 is closed and the entire metering is taken care of through the meter 12, being registered by the mechanism within the hood 26. At times of greatly increased flow, as would occur when the pipe 3 is drawn upon for fighting fire, the valve mechanism 6 is open, whereupon the meter 14 also registers and as soon as its flexible shaft 89 rotates faster than the shaft 87 (assuming the gears 69 and 70 are of the same size), it controls the rate of actuation of the pump 32 while the meter 12 is ineffective to do this.

In so far as the actuation of the pump control is concerned, each of the metering units thus acts as a motor and that motor which drives the gear 68 at the faster rate at any one time is effective in controlling the rate of drive of the pump 32. These motors, however, function as meters and it is essential that they be operated under very light load in order that they shall register correctly, for this reason it is desirable that they be employed not to furnish the power to drive the pump 32, but only to control the rate at which the power supplied from another source, as from the motor unit 40, is used. Thus there is only a slight additional load on the meters over that which is normally imposed by the registering mechanisms which are driven by the rotating meter elements.

In Figures 6 and 8 another embodiment of this invention is illustrated, this embodiment comprising a proportional type meter which is employed for measuring during the ordinary normal flow of water, together with an auxiliary motor which may, if desired, be a meter employed to operate the chlorinating apparatus during periods of such low flow that the proportional meter would not be in operation. Such an installation, for example, might be employed where the proportional meter is employed to register during the normal day time flow of water, while the separate motor might be brought into actuation to operate the chlorinator at a low rate during the night when the normal flow would be insufficient to actuate the proportional meter, but where the flow would be sufficient so that were the chlorinator not in actuation during the night, there would result the passage of untreated water. This would result in a dangerous condition, since the pipes would be carrying wholly untreated water for a time in the morning.

Referring to these figures, at 100 is indicated the conduit of the proportional meter interposed in the main pipe line, this conduit being provided with the usual restriction or orifice 101 by which a portion of the water is normally diverted through the by-pass 102 within which is positioned a meter 103. This meter may be of any suitable type, and, as shown in Figure 8, may actuate a shaft 104 connected through an over-running clutch, such as the ratchet clutch shown at 105, with a shaft 106. The shaft 104 has fixed thereto a bevel gear 107 which meshes with a similar gear 108 on a shaft 109, this shaft actuating the registering mechanism contained within the register casing 110. At 111 is shown a meter of any type suitable for measuring during comparatively low flows, this being connected to the by-pass 102 through the pipe 115 shown as provided with a control valve 116. The discharge from the meter 111 is shown at 117 and it may lead to waste, if desired. This meter 111 is provided with a register drive shaft 120 on which is fixed a bevel gear 121 which meshes with a bevel gear 122 on a shaft 123. This shaft 123 is connected as through a flexible shaft 124 with a shaft 125 positioned above the register casing 110, and this shaft 125 is connected through any suitable over-running clutch mechanism 126 to a shaft 127 carrying a bevel gear 128. This gear meshes with a gear 129 on the shaft 106. Thus when the shaft 104 is rotating faster than the shaft 127 (corrected, if necessary, for the driving ratio between the gears 128 and 129), the shaft 106 is driven from the shaft 104, but when the shaft 104 slows down or stops and the meter 111 is being driven, the shaft 127 takes up the drive and rotates the shaft 106. This shaft 106 is the valve-driving shaft for the pump 32 shown in outline in Figure 6 by which the chlorine feed is controlled. Thus when the normal daylight flow, which is sufficient to actuate the by-pass meter 103, is reduced at evening to such a point that the meter 103 will not properly register, the valve 116 is opened, whereupon the meter 111, which acts as a motor, is thrown into operation and takes up the control of the chlorine feed mechanism whenever the speed of the meter 103 falls below a predetermined point, and where the meter 111 is exhausted to waste, it is driven constantly so long as the valve 116 is open. Thus the chlorinator is actuated at a slow rate even though the meter 103 fails to operate, and whenever the flow through the main rises to a point where the meter 103 starts to function at a predetermined rate, this meter takes upon itself the drive of the chlorinator feed valve, whereupon the meter 111 becomes inoperative to do so, even though it continues to run as long as the valve 116 remains open. The amount of water passed through the meter 111 may be indicated by a suitable register mechanism (not shown) located within the register casing 130.

Since the function of the meter 111 when it is discharged to waste is that of a motor to keep the chlorinator mechanism in operation, any other suitable type of motor may be employed in place of it as may be found more convenient. For example, in Figure 9, the place of the meter 111 is taken by a small electric motor which may be of the type commonly employed for actuating clocks. It is shown at 135 and is caused to drive a shaft 136 through an over-running clutch mechanism at 137. The shaft 136 carries a bevel gear 138 which meshes with a gear 139 on the chlorinator valve control shaft 106. Thus, whenever the meter 103 is operating at a speed below a predetermined minimum or is not operating, the control of the chlorinator is provided by the motor 135, while as soon as the meter 103 resumes its predetermined rate, it takes charge of and controls the rate of operation of the chlorinator and the motor 135 becomes ineffective to do so.

From the foregoing description of certain embodiments of this invention, it should be evident to those skilled in the art that various changes and modifications might be made without departing from the spirit or scope of this invention as defined by the appended claims.

I claim:

1. The combination with a system comprising a fluid conduit, a pair of meters for measuring flow through said conduit, one of said meters being responsive during small rates of flow and the other of said meters being responsive during large rates of flow, of flow-producing mechanism, means for actuating said mechanism, a shaft for controlling said mechanism, and controlling connections from said meters to said shaft including over-running clutches, whereby only that meter effective to cause said shaft to be driven at the higher rate will be in controlling relation to said mechanism at any time.

2. The combination with a fluid conduit having a meter for registering flow through said conduit, or a flow-producing means, a motor, and connections from both said meter and said motor for controlling said flow-producing means, said connections including automatically acting selective mechanism causing the actuation of said flow-producing means to be controlled by at least either said meter or said motor.

3. In combination, a liquid conduit, means actuated by liquid pressure from said conduit for feeding material into the liquid in said conduit, a pair of motors, at least one of which motors is in driven relation to liquid flow in said conduit, means for controlling the actuation of said feeding means, and driving means actuated by each of said motors, and including means for causing that driving means which is moving at the faster rate at any given time to actuate said controlling means unaffected by the other driving means.

4. In combination, a liquid conduit, a motor driven by liquid flow in said conduit, said conduit including a by-pass around said motor, a second motor the speed of which is controlled by flow of liquid through said by-pass, means actuated by liquid pressure in said conduit for feeding fluent material into liquid flowed through said conduit, and means actuated by one or the other of said motors, depending on their relative speeds, for controlling said feeding means.

DAVID J. PURDIE.

CERTIFICATE OF CORRECTION.

Patent No. 2,165,153.                                                        July 4, 1939.

DAVID J. PURDIE.

It is hereby certified that error appears in the printed specification of the above numbered patent requiring correction as follows: Page 3, second column, line 72, claim 2, for the word "or" read of; and that the said Letters Patent should be read with this correction therein that the same may conform to the record of the case in the Patent Office.

Signed and sealed this 15th day of August, A. D. 1939.

Leslie Frazer (Seal)                                            Acting Commissioner of Patents.